Figure 1:
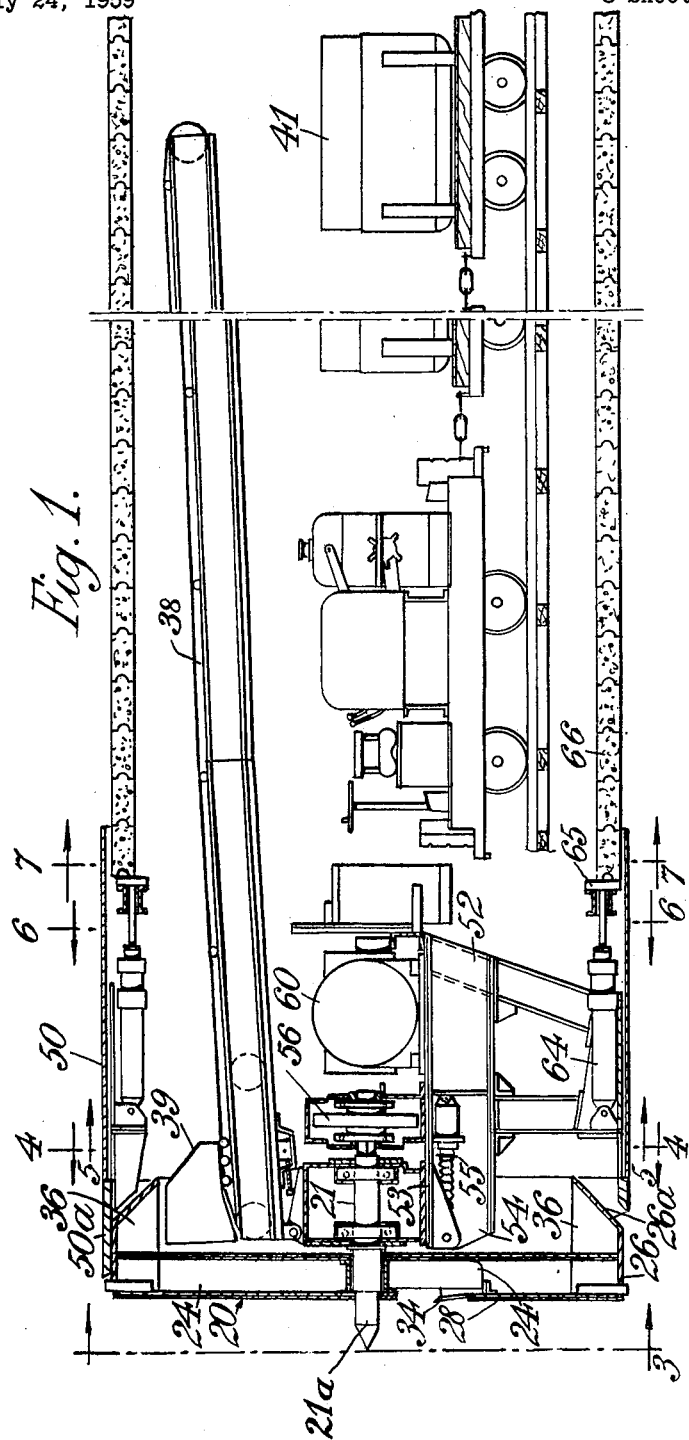

Jan. 29, 1963  N. D. PIRRIE ET AL  3,075,591
TUNNEL BORING MACHINES
Filed July 24, 1959  8 Sheets-Sheet 1

Jan. 29, 1963    N. D. PIRRIE ET AL    3,075,591
TUNNEL BORING MACHINES
Filed July 24, 1959    8 Sheets-Sheet 2

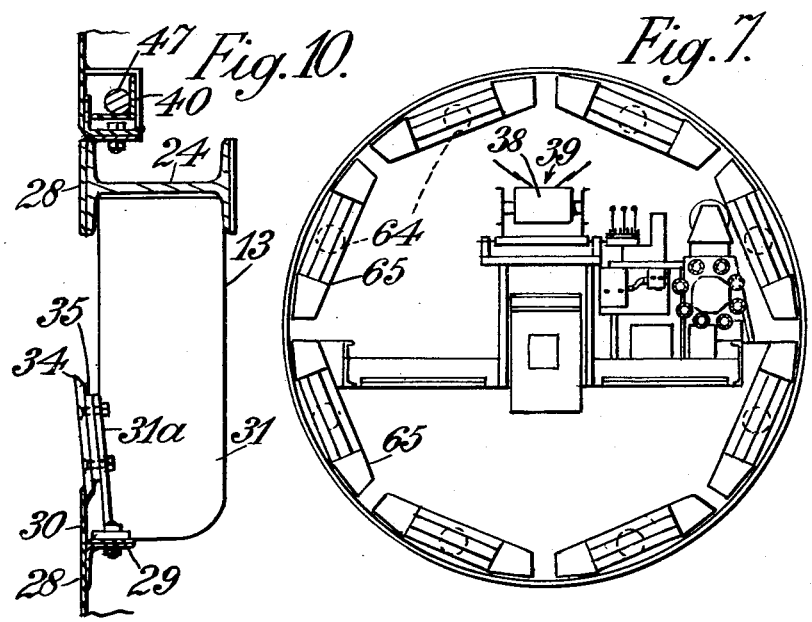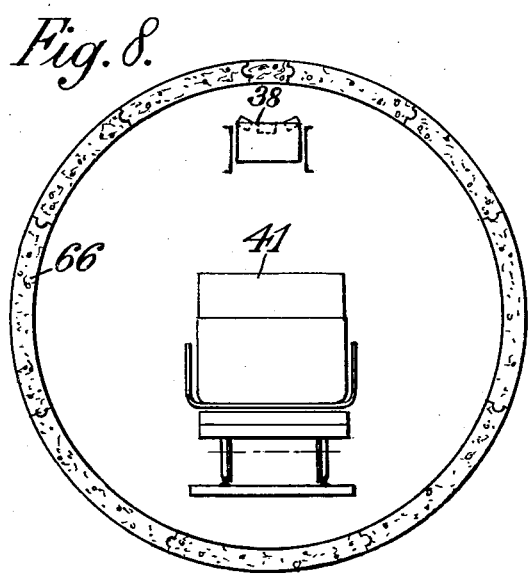

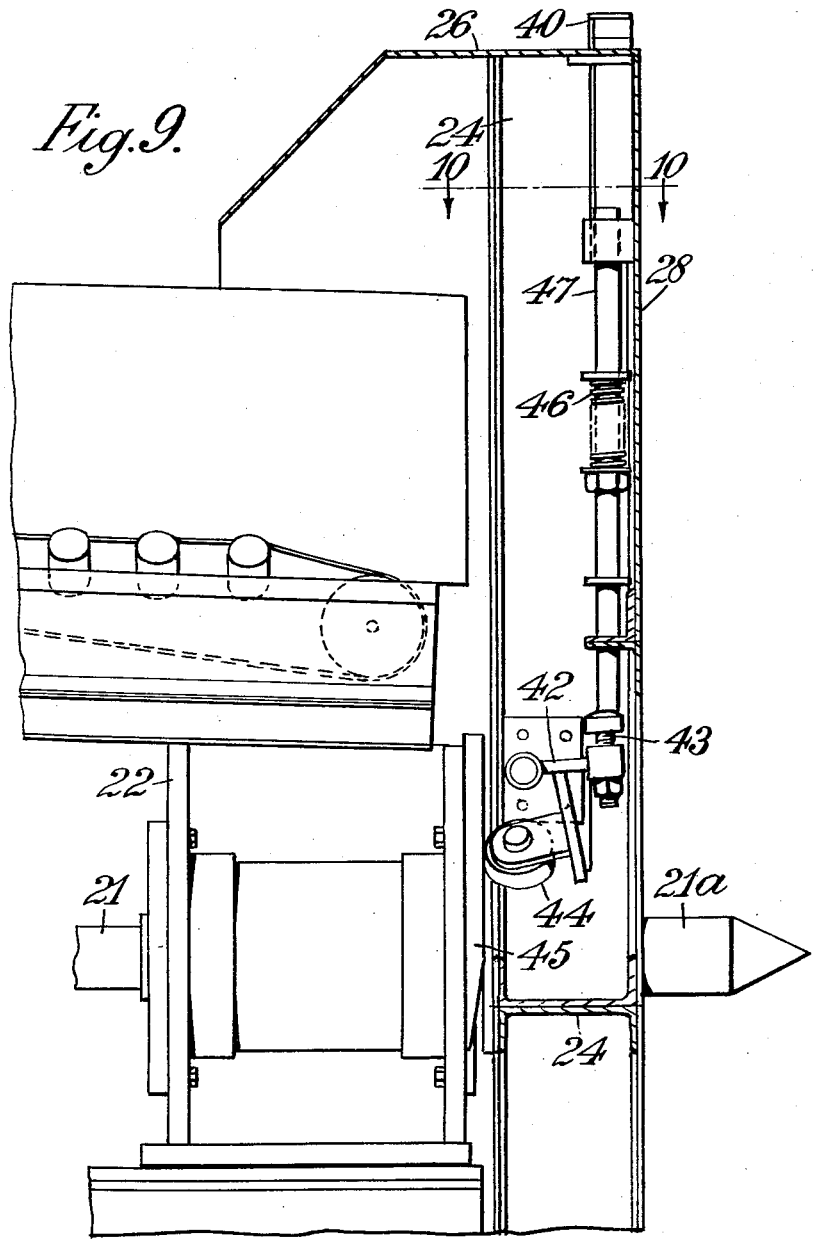

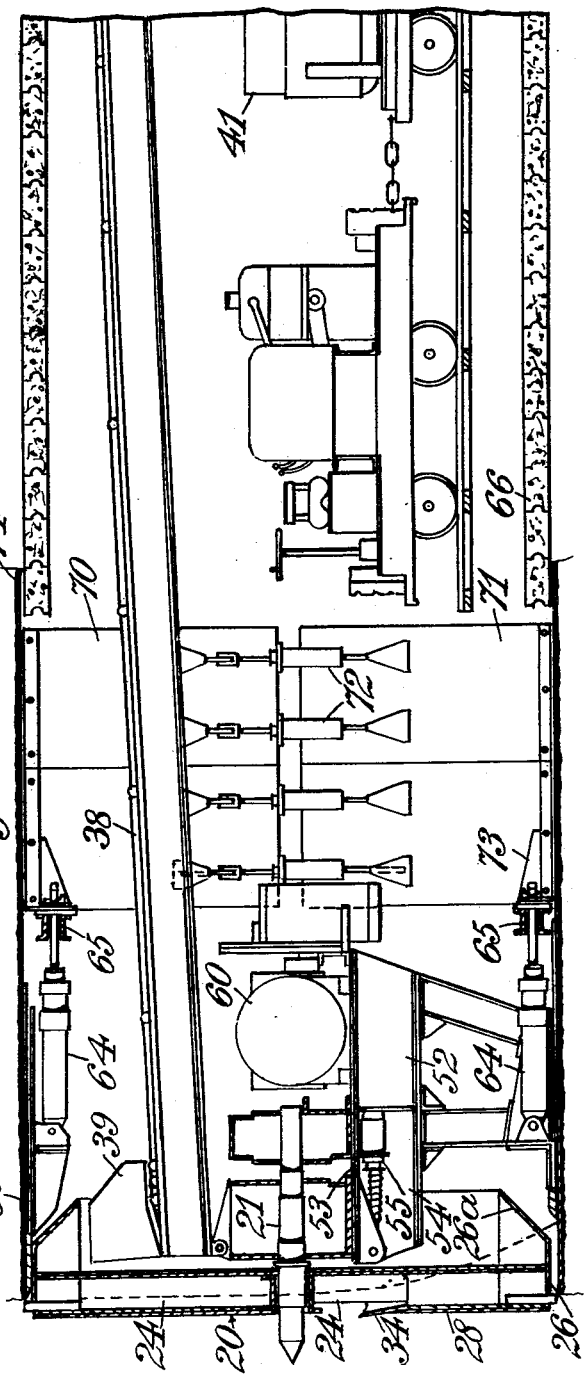

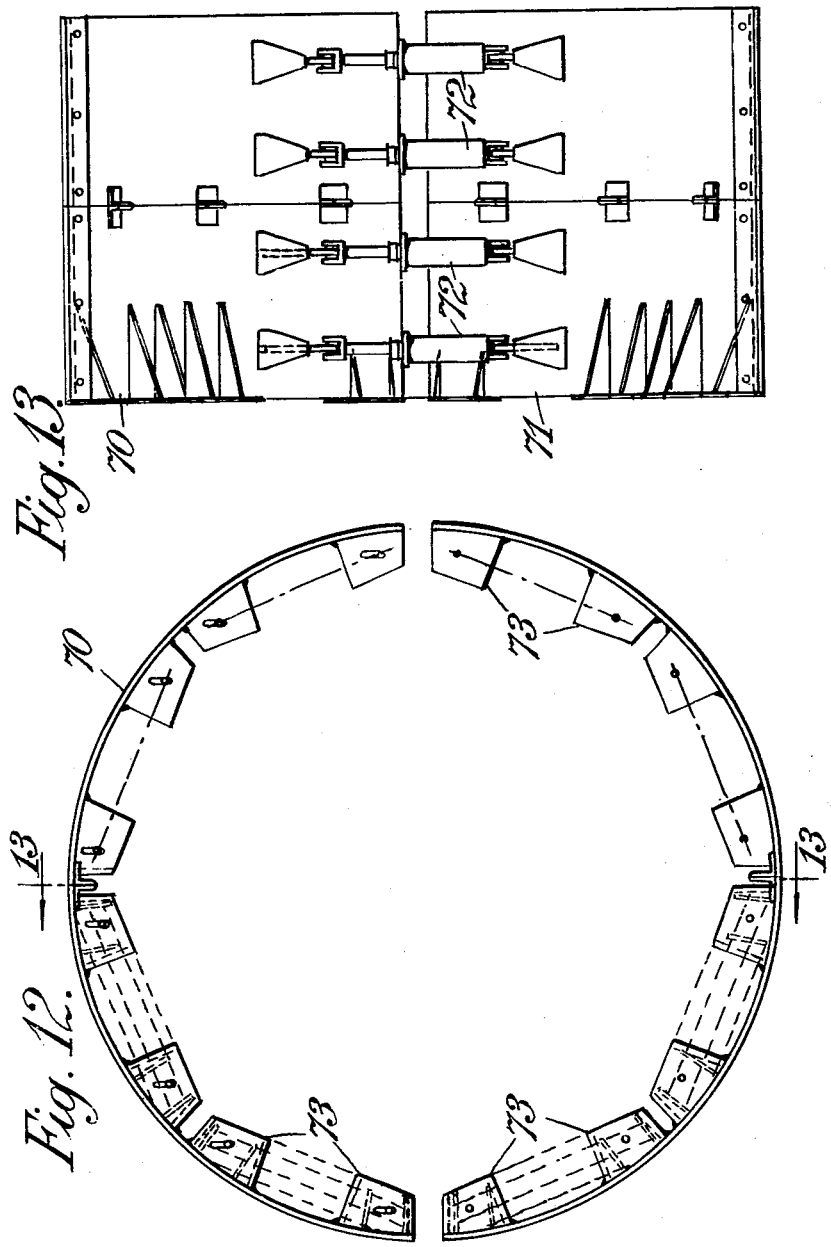

United States Patent Office 3,075,591
Patented Jan. 29, 1963

3,075,591
TUNNEL BORING MACHINES
Norman Duncan Pirrie, Sutton, Gustav Wolfgang Amann, Epsom, and Reginald John Woolgar, Hayes, England, assignors to Economic Foundations Limited, Pontypool, Monmouthshire, England, a company of Great Britain
Filed July 24, 1959, Ser. No. 829,242
4 Claims. (Cl. 175—319)

The invention relates to tunnel boring machines and has for one of its objects to improve the speed and ease of operation of such machines, at least when boring through some kinds of materials, such as London blue clay.

The invention provides a tunnel boring machine comprising a rotatable cutting head having one or more cutting members operable on the tunnel face and arranged to divert the cuttings rearwardly as they are produced and an annular series of inwardly facing buckets around the head immediately behind the cutting member or members, the buckets being arranged to receive the cuttings as they fall from the cutting member or members, to convey the cuttings upwardly to a discharge station and there to discharge the cuttings downwardly.

The head will usually be rotatable about the axis of the tunnel but this is not necessarily so. It may, for example, be rotatable about an axis which is offset to a small extent from the tunnel axis.

Preferably, the cutting member, or each such member, provides an elongated cutting edge which extends radially or in a direction with a substantial radial component. The edge, or one or more of them, may extend from near the axis of rotation of the head to the periphery of the head, or two or more edges may do so collectively. The edge or edges may have a positive angle of rake relative to the plane of rotation and they may also have a positive clearance angle. The angles may be made adjustable.

It is also preferred that the machine has a rearwardly extending conveyor beneath the discharge station for the reception and removal of the cutting as they are discharged from the buckets.

The cutting head may have a pointed centre or stinger on the axis and the centre may have radial cutter blades rotatable with the head to remove any core left by the cutting edges or other members aforesaid.

The machine may have means for feeding the cutting members into the tunnel face. These means may react against a lining for the tunnel as it is built behind the machine or against a special reaction device as later described. There may, for example, be a frame which carries the head for rotation and which embodies means (e.g. including a Greathead shield) for supporting the frame from the tunnel walls, means for advancing the frame and the head as cutting progresses thereby to feed the cutting members into the cutting face and means for moving the head rearwardly relative to the frame, whereby the head may be withdrawn from the face e.g. to clear an obstruction. The conveyor, when provided, may be coupled to the head for movement therewith.

The machine may include a Greathead shield extending rearwardly from the head and, preferably surrounding or partly surrounding the head at the front end of the shield. In order that the tunnel may be sufficiently large to receive the shield as it is advanced, the head may have one or more cutters projecting from its circumference and arranged to enlarge the bore around the head for the reception of the shield. These cutters may be constructed to feed their cuttings inwardly through the head into the buckets. In one construction embodying this feature the cutter or one or more of them when there are several is given a cyclic in and out movement (e.g. once per revolution) in order to enlarge the radius of the upper and/or other selected portion of the bore so as to provide clearance around the shield.

The invention also provides a tunnel boring machine having a cutting head, releasable means for making holding engagement with the tunnel walls behind the head, means for advancing the head along the tunnel relative to the holding means when in holding engagement and reacting against said means and means for advancing the holding means, when released, towards the head. The holding means may, for example, be expandable into frictional holding engagement with the tunnel walls. The head may be constructed as described above and it may have a co-operating shield.

Figure 2:
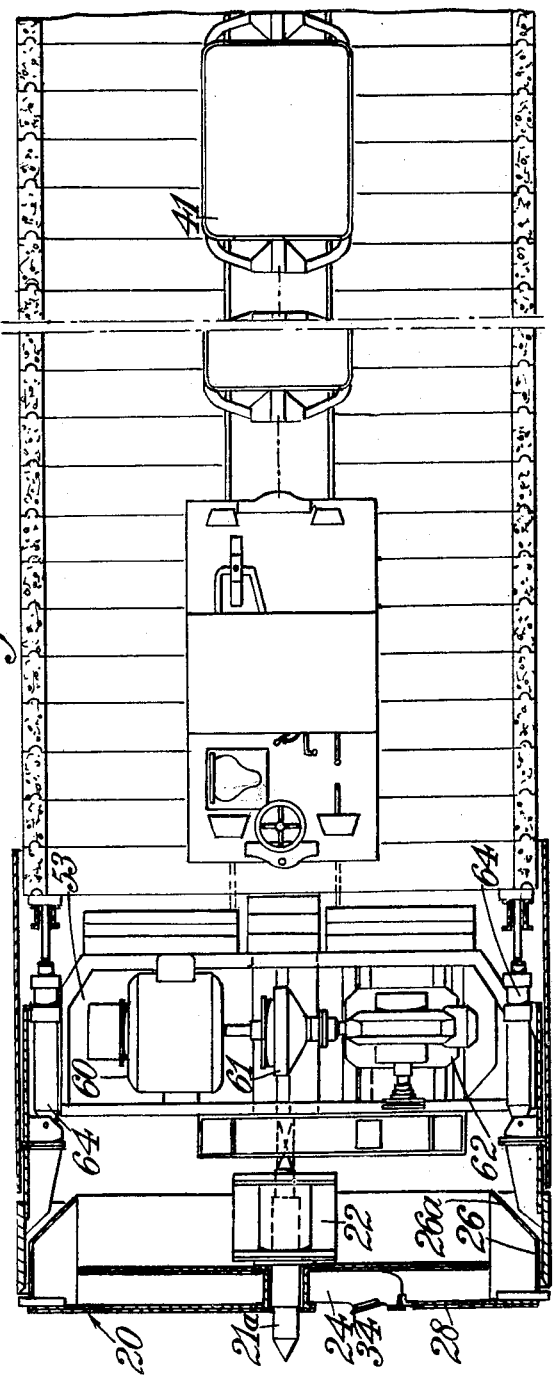
Figure 3:
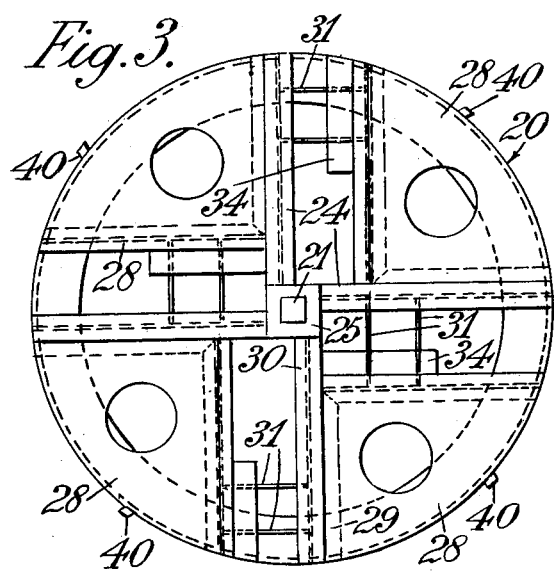
Figure 4:
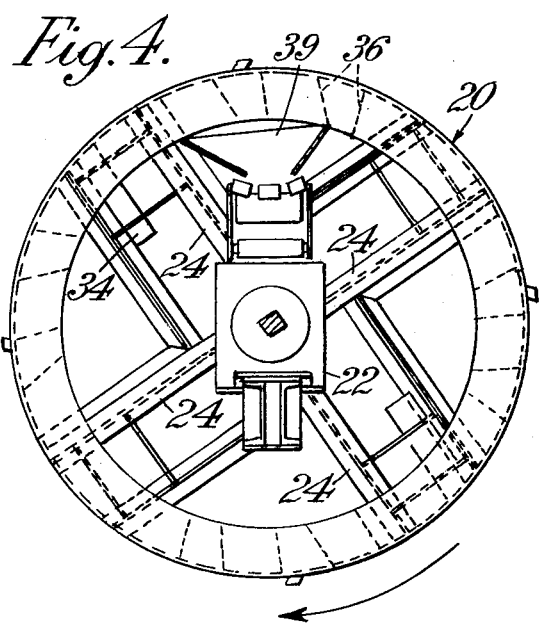
Figure 5:
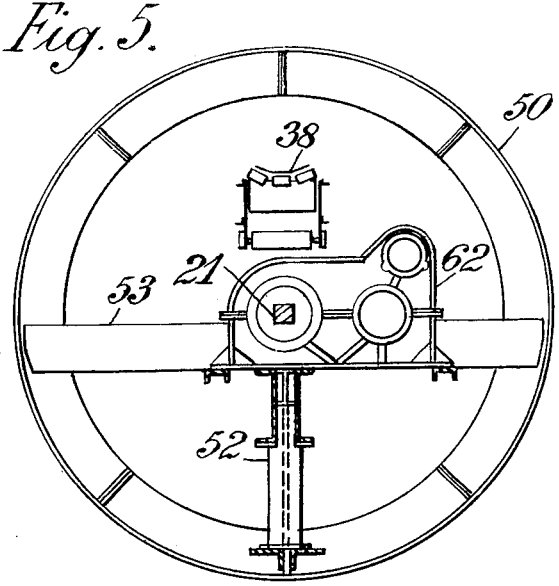
Figure 6:
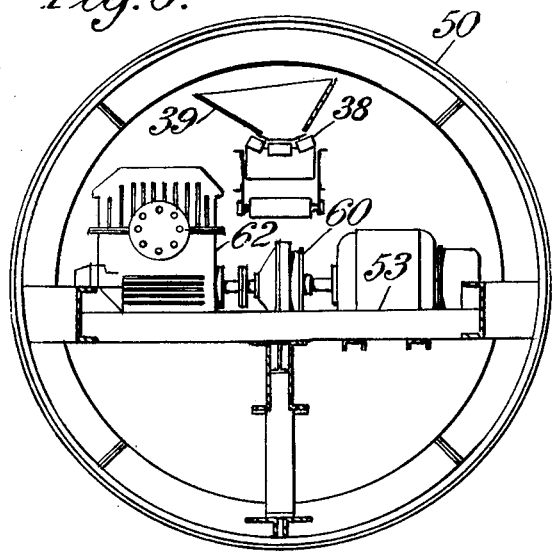

A specific construction of a machine according to the invention, and a modified form of the machine, will now be described, by way of example, and with reference to the accompanying drawings in which:

FIGURE 1 is a sectional elevation showing the machine within a tunnel,
FIGURE 2 is a sectional plan of the machine,
FIGURE 3 is a view in the direction 3—3 in FIGURE 1,
FIGURE 4 is a section on the line 4—4 in FIGURE 1,
FIGURE 5 is a section on the line 5—5 in FIGURE 1,
FIGURE 6 is a section on the line 6—6 in FIGURE 1,
FIGURE 7 is a section on the line 7—7 in FIGURE 1,
FIGURE 8 is a view in the direction 8—8 in FIGURE 1,
FIGURE 9 is a sectional view of the cutting head showing one of the projecting peripheral cutters,
FIGURE 10 is a section on the line 10—10 in FIGURE 9 and shows one of the radial cutting blades,
FIGURE 11 is a view, corresponding to FIGURE 1, showing the modified machine,
FIGURE 12 is an end view of an expanding reaction member used in the machine shown in FIGURE 11, and
FIGURE 13 is a view in the direction 13—13 in FIGURE 12.

The machine forming the subject of this example is intended for boring tunnels in various types of ground including clay.

The machine comprises a cutting head 20 which is carried for rotation by a shaft 21 supported in bearings in a casing 22. The head 20 is fabricated from H-section members and steel plate. It comprises four H-members 24 radiating from a central hub 25 and an outer annulus 26 of sheet material. Secured to the leading edges (considered in relation to the direction of rotation of the head) of the members 24 there are sector plates 28 at the front of the head. These plates are also welded around the annulus 26. The front or leading radial edges of the plates 28 are stiffened by angles 29, 30 and are also connected to the preceding members 24 by gusset plates 31. The drawings show two such gusset plates at each position but more may be provided if desired and they may be spaced at intervals over the whole radial length of each member 24. The gusset plates support, by angle portions 31a (FIGURE 10), radial cutting blades 34. The blades have positive angles of rake and clearance in relation to the plane of rotation, the angles being adjustable by means of packing pieces 35 of varying shapes. As shown in FIGURE 3 there are two blades near the periphery alternating with two blades near the centre but, if desired, all the blades may extend from near the centre to the periphery. The head is open behind the blades and plates 28.

The inner or rear edge of the annulus 26 is turned inwardly as shown at 26a, so as to form an annular trough. The trough is divided into an annular series of buckets by partitions 36. In use the material cut by blades 34 as the head rotates is diverted rearwardly by the rake of the blades and falls into the buckets. It is then elevated by the buckets and discharged into a rubber chute or hopper 39 which delivers it onto a belt conveyor 38. The conveyor delivers the material into trucks or skips 41. The rear end of the conveyor may be supported from the tunnel wall by a prop, not shown. The partitions 36 may be shaped to ensure that the buckets do not discharge until they are positioned to deliver into the chute 39. The trucks may be replaced by a second conveyor, if desired.

The front end of the shaft 21 is formed as a conical centre or stinger 21a and in order to cut out the centre or core of the tunnel face the stinger may be provided with short radial cutter blades (not shown).

Projecting from the periphery of the head there are four cutters 40 of angle section. These cutters serve to enlarge the bore around the head for the passage of the shield, later described. The cuttings pass along the angles into the interior of the head (i.e. into the buckets).

The cutters 40 may project by an adjustably fixed amount or one or more of them may move in and out cyclically during rotation thereby to enlarge certain parts of the bore to a greater extent than others. Thus they may be arranged to enlarge the upper part of the bore to a greater extent than the lower and so to reduce the resistance to movement of the machine and to facilitate changes in the direction of advance of the machine. FIGURES 9 and 10 show a construction by which such in and out movements may be effected. The cutter 40 is secured to a rod 47 guided for radial movement. At the inner end of the rod there is a bellcrank lever 42 pivoted to the head frame and having a bolt 43 engageable with the rod 47 and a roller 44 running on a fixed cam 45. The cam is arranged to project the cutter 40 around the upper 180° of rotation of the head further than it projects during the lower part. A spring 46 effects the inward movements of the cutter.

Behind and partly surrounding the head there is a shield 50 having a stiffened leading edge 50a. Within the shield there is secured a framework 52 providing a diametrical platform 53 on which are mounted the driving means for the head and other ancillary equipment including a hydraulic pump and motor and a driving motor for the conveyor. The casing 22 carrying the cutting head is mounted for fore and aft sliding movement on the front end 54 of a beam forming a part of the framework and a double-acting hydraulic ram 55 is provided for effecting such sliding movements. In operation the head is maintained at the forward end of its travel so that it may be withdrawn to the position shown, should it be required to clear an obstruction or for any other reason, such as starting up the rotary head in a free condition to relieve the motor of extensive load. To permit such movement the rear end of shaft 21 is of square section and is slidable in a driving gear 56 for rotating the shaft. The conveyor moves with the cutter head.

Rotation of the head is effected by an electric motor 60 which is coupled through a fluid coupling 61 to a reduction gear 62 which in turn drives shaft 21.

To prevent rotation of the shield in the tunnel by the reaction of the driving motor the shield has external longitudinal fins (not shown) which bite into the tunnel walls should the machine during the course of its advancement through the tunnel develop a roll about its longitudinal axis, these fins can be withdrawn and replaced by fins having a slight inclination to the axis in such a direction as to correct the roll. When after a short distance the machine is back to its true horizontal condition, the inclined fins can be removed and replaced once more by the normal longitudinal fins.

Within the shield there are eight double-acting hydraulic rams 64 spaced around the circumference of the shield. These rams are anchored at their front ends to the shield and at their rear ends they have feet 65 for engagement with the ends, for the time being, of the tunnel lining 66. The rams operate, by reaction against the lining to advance the machine as cutting proceeds. When they have been fully extended they are withdrawn to permit insertion of a further ring of lining segments. The rams may be extended individually to enable the direction of advance to be controlled.

FIGURES 11 and 13 show a modified construction of the machine which incorporates a device which enables the use of the tunnel lining as the reaction member for rams 64 to be avoided, as may be desirable, for example, when the lining is cast in situ. This device consists of a two part liner 70, 71 for the tunnel. Between the two parts there are hydraulic rams 72 by which the two parts may be forced apart with frictional engagement with the tunnel walls 74. At one end the liner has brackets 73 to which the feet 65 may be secured. In use the device is erected in the tunnel behind the shield and in front of the tunnel lining. To advance the shield, the device is expanded and then serves as a reaction member for rams 64. When these rams have been fully extended, the rams 72 are retracted which releases the grip on the tunnel and the device is drawn forward by means of rams 64 ready for the next operation.

It is an advantage of the machine as described above that the space beneath the platforms is comparatively free and permits access to the head to be obtained.

The machine may incorporate various modifications and refinements. For instance the cutting blades may have teeth or serrations on their edges. An interlock may be provided between the controls for the rams 64 and the ram 55 to ensure that the machine cannot be advanced by rams 64 unless the head is in its forward position.

We claim:

1. A tunnel boring machine comprising an annular non-rotating shield, a head located at one end of said shield, an annulus coaxial with and fixedly carried by the head, said annulus defining the peripheral extremity of the outer face of the head, said annulus providing a channel section facing inwardly of said annulus for receiving cuttings, means supported on the shield for rotating the head relative to the shield about the common axis thereof, tunnel face cutting blades operatively disposed at the outer end face of the head, tunnel wall-cutting blades radially slidably mounted on the head and projecting through and beyond the periphery of said annulus, and operating means mounted on the head for moving the wall-cutting blades radially inwardly and outwardly cyclically during each revolution of the head in timed relation with the rotation of the head.

2. A tunnel boring machine as claimed in claim 1 wherein the mouth of the channel section faces said axis and has partitions which divide the annulus into a circumferentially continuous series of buckets, and means supported on the shield for receiving cuttings discharged from the said buckets.

3. A tunnel boring machine as claimed in claim 1 wherein said operating means includes a cam follower associated with each wall-cutting blade, and a fixed cam track for said follower mounted on the shield to effect the cyclical movement of each wall-cutting blade.

4. A tunnel boring machine comprising an annular non-rotating shield, a head adjacent one end of and coaxial with the shield, an annulus fixedly mounted on and coaxial with the head, said annulus defining the peripheral extremity of the outer face of the head, said annulus providing a channel section facing inwardly of said annulus for receiving cuttings, means carried by the shield for rotating the head relative to the shield about a common axis, said head comprising a frame supported on the shield, tunnel face cutting blades on the advancing face of the frame, peripheral tunnel wall-cutting blades projecting through and beyond the periphery of said annulus, means mounting said peripheral wall-cutting blades for radial sliding movement on the head, and operating means mounted on the head operable at least once during each revolution of the head for moving the peripheral tunnel wall-cutting blades radially outwardly into cutting engagement with the tunnel wall around a predetermined arcuate portion thereof and then withdrawing the blades radially inwardly, the said portions being the same for each revolution of the annulus.

References Cited in the file of this patent

UNITED STATES PATENTS

| | | |
|---|---|---|
| 74,069 | Fisher | Feb. 4, 1868 |
| 537,899 | Mitchell | Apr. 23, 1895 |
| 1,338,237 | Mack | Apr. 27, 1920 |
| 1,351,137 | Sheen | Aug. 31, 1920 |
| 1,888,085 | Humbel | Nov. 15, 1932 |
| 2,804,754 | Bridge | Sept. 3, 1957 |

FOREIGN PATENTS

| | | |
|---|---|---|
| 13,907 | Great Britain | 1896 |
| 9,549 | Great Britain | 1897 |
| 10,045 | Great Britain | 1901 |